(12) United States Patent
Walter

(10) Patent No.: US 11,087,150 B2
(45) Date of Patent: Aug. 10, 2021

(54) DETECTION AND VALIDATION OF OBJECTS FROM SEQUENTIAL IMAGES OF A CAMERA BY USING HOMOGRAPHIES

(71) Applicant: Conti Temic microelectronic GmbH, Nuremberg (DE)

(72) Inventor: Michael Walter, Heerbrugg (CH)

(73) Assignee: Conti Temic microelectronic GmbH, Nuremberg (DE)

( * ) Notice: Subject to any disclaimer, the term of this patent is extended or adjusted under 35 U.S.C. 154(b) by 115 days.

(21) Appl. No.: 16/323,898

(22) PCT Filed: Sep. 28, 2017

(86) PCT No.: PCT/DE2017/200103
§ 371 (c)(1),
(2) Date: Feb. 7, 2019

(87) PCT Pub. No.: WO2018/059632
PCT Pub. Date: Apr. 5, 2018

(65) Prior Publication Data
US 2019/0180122 A1    Jun. 13, 2019

(30) Foreign Application Priority Data
Sep. 29, 2016    (DE) ...................... 10 2016 218 849.6

(51) Int. Cl.
*G06K 9/00* (2006.01)
*B60R 11/04* (2006.01)

(52) U.S. Cl.
CPC .......... *G06K 9/00805* (2013.01); *B60R 11/04* (2013.01); *B60W 2420/42* (2013.01); *G06T 2207/30261* (2013.01)

(58) Field of Classification Search
None
See application file for complete search history.

(56) References Cited

U.S. PATENT DOCUMENTS

| | | |
|---|---|---|
| 6,246,961 B1 | 6/2001 | Sasaki et al. |
| 6,445,809 B1 | 9/2002 | Sasaki et al. |

(Continued)

FOREIGN PATENT DOCUMENTS

| | | |
|---|---|---|
| DE | 102004046101 | 9/2006 |
| DE | 102009028742 | 2/2011 |

(Continued)

OTHER PUBLICATIONS

English translation of the International Search Report of the International Searching Authority for International Application PCT/DE2017/200103, dated Jan. 25, 2018, 3 pages, European Patent Office, HV Rijswijk, Netherlands.

(Continued)

*Primary Examiner* — Wei Wen Yang
(74) *Attorney, Agent, or Firm* — W. F. Fasse

(57) ABSTRACT

A method and a device are for identifying objects from camera images, e.g. for vehicle driver assistance systems. The method involves: capturing a series of camera images, determining a plurality of planes in space by associating adjacent corresponding features in at least two consecutive camera images with a given one of the planes, determining a relative translation vector of a plane, and identifying dynamic objects in the camera images based on the relative translation vector of an associated plane.

19 Claims, 6 Drawing Sheets

(56) References Cited

U.S. PATENT DOCUMENTS

| | | | |
|---|---|---|---|
| 6,731,777 | B1 | 5/2004 | Nishigaki et al. |
| 6,906,620 | B2 | 6/2005 | Nakai et al. |
| 7,046,822 | B1 | 5/2006 | Knoeppel et al. |
| 7,330,568 | B2 | 2/2008 | Nagaoka et al. |
| 7,664,314 | B2 | 2/2010 | Stein |
| 7,925,050 | B2 | 4/2011 | Nagaoka et al. |
| 8,005,266 | B2 | 8/2011 | Saka et al. |
| 8,045,759 | B2 | 10/2011 | Mizutani et al. |
| 8,098,889 | B2 | 1/2012 | Zhu et al. |
| 8,121,348 | B2 | 2/2012 | Hayasaka et al. |
| 9,824,586 | B2 | 11/2017 | Sato et al. |
| 2002/0087269 | A1 | 7/2002 | Sasaki et al. |
| 2004/0220724 | A1 | 11/2004 | Hahn et al. |
| 2006/0178830 | A1 | 8/2006 | Sherony |
| 2009/0169052 | A1* | 7/2009 | Seki .................. G06T 7/74 382/103 |
| 2010/0194886 | A1 | 8/2010 | Asari et al. |
| 2010/0260377 | A1 | 10/2010 | Takahashi |
| 2011/0133917 | A1 | 6/2011 | Zeng |
| 2013/0010920 | A1 | 1/2013 | Wein et al. |
| 2013/0027196 | A1 | 1/2013 | Yankun et al. |
| 2014/0161323 | A1 | 6/2014 | Livyatan et al. |
| 2015/0086080 | A1 | 3/2015 | Stein et al. |
| 2015/0332114 | A1 | 11/2015 | Springer |
| 2019/0180121 | A1 | 6/2019 | Walter |
| 2019/0213427 | A1 | 7/2019 | Walter |

FOREIGN PATENT DOCUMENTS

| | | |
|---|---|---|
| DE | 102015224796 | 6/2017 |
| EP | 2 993 654 | 3/2016 |
| WO | WO 2015/177648 | 11/2015 |

OTHER PUBLICATIONS

PCT International Preliminary Report on Patentability including English Translation of PCT Written Opinion of the International Searching Authority for International Application PCT/DE2017/200103, dated Apr. 2, 2019, 6 pages, International Bureau of WIPO, Geneva, Switzerland.

German Search Report for German Patent Application No. 10 2016 218 849.6, dated Apr. 26, 2018, 7 pages, German Patent and Trademark Office, Muenchen, Germany, with partial English translation, 5 pages.

Peng Chang et al., "Stereo-Based Vision System for Automotive Imminent Collision Detection", IEEE Intelligent Vehicles Symposium, Parma, Italy, Jun. 14-17, 2004, XP010727481, ISBN: 978-0-7803-8310-4, pp. 274 to 279.

Prateek Singhal et al., "Top Down Approach to Detect Multiple Planes in Images", Proceedings of the 2014 Indian Conference on Computer Vision Graphics and Image Processing, ICVGIP '14, New York, NY USA, Jan. 1, 2014, XP055439700, ISBN: 978-1-4503-3061-9, 6 pages.

Richard Hartley et al., "Tutorial: Multiple View Geometry", CVPR Jun. 1999, https://de.scribd.com/document/96810936/Hartley-Tut-4up, accessed on Sep. 26, 2016, 57 pages.

Johann Prankl et al., "Interactive Object Modelling Based on Piecewise Planar Surface Patches", Computer Vision and Image Understanding, vol. 117, No. 6, Jun. 1, 2013, XP55162053, ISSN: 1077-3142, pp. 718 to 731.

Masatoshi Okutomi et al., "Robust Estimation of Planar Regions for Visual Navigation Using Sequential Stereo Images", Proceedings of the 2002 IEEE International Conference on Robotics and Automation, Washington, D.C., vol. 4, May 11, 2002, XP032882657, ISBN: 978-0-7803-7272-6, pp. 3321 to 3327.

European Office Action dated Mar. 9, 2021 in European Patent Application No. 17 794 221.6, 6 pages, with (computer-generated) English partial translation, 3 pages.

Manolis I.A. Lourakis et al., "Detecting Planes in an Uncalibrated Image Pair", Proceedings of the 13th British Machine Vision Conference: Sep. 2-5, 2002, Cardiff University, Jan. 1, 2002, XP055439691, ISBN: 978-1-901725-19-3, pp. 57.1 to 57.10 (pp. 587 to 596).

* cited by examiner

DETECTION AND VALIDATION OF OBJECTS FROM SEQUENTIAL IMAGES OF A CAMERA BY USING HOMOGRAPHIES

FIELD OF THE INVENTION

The invention relates to a method for identifying objects from images from a camera and for tracking the same and can be used in particular in camera-based driver assistance systems.

BACKGROUND INFORMATION

Vehicle identification systems according to the current prior art are mostly classification-based. Classification-based systems can recognize vehicles or vehicle components which they have seen in their training data. New vehicle designs, as well as changing structures can, however, result in a considerably reduced system performance and require generic approaches for identifying objects.

US 2014/0161323 A1 shows a method for producing dense three-dimensional structures in a road environment from images which are captured with a mono camera.

EP 2 993 654 A1 shows a method for forward collision warning (FCW) from camera images. In this case, an image section in which the ego vehicle will arrive within a predefined time interval is analyzed. If an object is identified there, a collision warning is output.

SUMMARY OF THE INVENTION

It is an object of the present invention to indicate a method for identifying objects.

The following considerations form the starting point of the invention: if the camera positions of two frames (individual images) are known, point correspondences (corresponding feature points) can be triangulated, but no objects are generated because the triangulation does not have any model knowledge which could cluster a cloud of points into meaningful objects. The disadvantages of monocular systems are that objects close to the epipole can only be triangulated inaccurately and the smallest errors in the egomotion (the camera's own motion) can make themselves felt. The pixel in a first camera image, at which the center of the camera is imaged at a second point in time, is designated the epipole. When the vehicle is driving straight ahead, the vanishing point corresponds e.g. to the epipole. This is, however, the relevant region in order to identify collisions with stationary vehicles or vehicles driving ahead. Dynamic objects can be triangulated if they are moving in accordance with epipolar geometry. However, they are estimated as being too close or too far away because the relative speed is not known.

If, instead of individual correspondences, multiple adjacent correspondences (corresponding features) are observed and associated with one of a plurality of planes in space, objects can be segmented due to different speeds, scalings and deformation.

A method according to the invention for detecting objects from a series of images from a vehicle camera comprises the following steps:
a) capturing a series of images by means of a vehicle camera,
b) determining motion of planes in space, wherein the planes are determined by means of an association of adjacent, corresponding features in at least two consecutive images, and
e) identifying dynamic objects by means of the determined motion of at least one plane.

The vehicle camera is preferably configured to capture the surroundings of a vehicle. The surroundings are in particular the surroundings lying in front of the vehicle. The vehicle camera can preferably be integrated into a driver assistance device or can be connected thereto, wherein the driver assistance device is in particular configured to identify objects from the image data provided by the vehicle camera device. The vehicle camera device is preferably a camera which is to be arranged in the interior of the motor vehicle behind the windshield and aimed in the direction of travel. The vehicle camera is particularly preferably a monocular camera.

Individual images are preferably captured by means of the vehicle camera at specific or known points in time, resulting in a series of images.

The correlation of a feature in a first image to the same feature in a second image is designated a correspondence. Corresponding features in two images can also be described as a flux vector which indicates how the feature has moved in the image. A feature can in particular be an image section (or patch), a pixel, an edge or a corner.

Step b) can alternatively be described as follows: determining the motion of multiple planes, in which a multiplicity of adjacent corresponding features lies or comes to lie in each case.

It is also subsumed under step b) that a plurality of planes is predefined in space, and an association of adjacent, corresponding features with, in each case, one of the predefined planes is carried out and the motion of this plane is then determined (cf. step d below)).

Consequently, dynamic objects can be distinguished from static objects in step e) by means of the motion of a plane which can be associated with an object.

In the context of the present invention, the term "plane" describes the following relationships: on the one hand, a criterion for accumulating adjacent corresponding features, i.e. these are considered to be associated if they lie in a common plane in space and develop over time in accordance with the motion of the plane.

Corresponding features accumulated in that manner are subsequently designated as e.g. a "ground plane", because they all lie in the plane which corresponds to the road plane. However, such a ground plane does not extend ad infinitum, but means a partial region of the plane, namely that region in which actually corresponding features are arranged.

The multiple planes established in that manner can be considered during the detection of objects. This can take place, for example, in such a way that a road hypothesis is deduced from an identified ground plane, and that an object hypothesis is generated for an elevated object from a back plane or a side plane. A free space can already be detected for elevated objects from a road hypothesis and object hypothesis (hypotheses), which indicates which free space can currently be driven in the surroundings of the vehicle. An advantageous application of the free space detection lies e.g. in road edge determination which does not depend on the identification of lane markings.

Therefore, the wording "detection of objects" can, for example, denote a generation of object hypotheses or objects.

According to a preferred embodiment, the method comprises the following step:
c) computing homographies (also called homographs herein) for adjacent corresponding features in order to establish the plurality of planes.

A homography or homograph describes the correspondence of points on one plane between two camera positions or the correspondence of two points in two consecutive images from the vehicle camera. By computing homographies i.e. homographs for adjacent corresponding features, thereby adjacent corresponding features can, in each case, be associated with a plane in space (see step b)).

The corresponding features can be advantageously divided into different segments by means of the computed homographies i.e. homographs, wherein a segment corresponds, in each case, to a plane in space.

Finally, a detection of objects can then take place, by taking account of the segmented features.

One advantageous further development of the method comprises the step d): Association of (adjacent) corresponding features with, in each case, a ground plane, a back plane or a side plane and determining $t/d=(t_x, t_y, t_z)$ as a measure of motion for the associated plane, wherein t describes the translation of the vehicle camera and d describes the distance from said plane (perpendicular to said plane).

In the case of a coordinate system, in which the x-direction runs horizontally or laterally, the y-direction runs vertically and the z-direction runs in the vehicle longitudinal direction, a ground plane can be predefined normally to the y-direction, a back plane can be predefined normally to the z-direction and a side plane can be predefined normally to the x-direction.

By computing homographs of a ground plane, a back plane and a side plane, an association with one of these planes can be made for adjacent, corresponding features or for each corresponding feature.

The homographies i.e. homographs for the back plane can preferably be computed in accordance with equation (10), or for the ground plane in accordance with equation (9), or for the side plane in accordance with equation (11).

In this case, a, b, c are constants, $x_0, y_0, x_1, y_1$ designate correspondences in the second image (index 0) captured at a point in time t–0, and the first image (index 1) captured at an earlier point in time t–1, and $t_x, t_y, t_z$ are the components of the vector t/d. In that vector, t describes the translation of the vehicle camera, and d describes the distance from a plane (perpendicular to said plane), that is to say along the normal vector of this plane. The components $t_x, t_y,$ or $t_z$ are also designated below as an "inverse TTC". TTC comes from "time to collision" and results, in one spatial direction, from the clearance i.e. spacing distance divided by the translational speed.

If multiple planes having an identical orientation occur, the planes having an identical orientation can preferably be separated by means of the associated $t_x, t_y, t_z$ values. For example, two back planes which are at differing distances in the z-direction from the vehicle camera can be distinguished from one another by means of different $t_z$ values.

According to an advantageous further development, a natural rotation of the vehicle camera can be determined between at least two consecutive images. The determination of one or more planes (planar regions) in the image which do not have any absolute translational motion. Objects which are at a very great distance or which are respectively infinitely distant do not have a (computable) translational motion ($t_x=t_y=t_z\approx0$). The motion of these planes in the image is therefore only due to the natural rotation of the camera. By implication, the natural rotation of the camera can therefore be reconstructed from the determination of the motion of relevant, corresponding features or planes.

The image coordinates of the epipole $x_{e,t0}$ can preferably be predicted at the point in time t by the homograph of static planes $H_{st}$ of the image coordinates of the epipole $x_{e,t1}$ at the point in time t–1: $x_{e,t0}=H_{st}*x_{e,t1}$ According to a preferred configuration, the pitch rate of the camera can be established as a $\tan((x_{e0}-x_{e1})/f)$ with the focal length f based on one pixel.

Alternatively or cumulatively, the yaw rate of the camera can advantageously be established as a $\tan((y_{e0}-y_{e1})/f)$ with the focal length f based on one pixel.

The natural rotation of the vehicle camera can preferably be established or deduced from data from the vehicle sensor cluster.

In particular, the rolling motion can be established from these data which can be provided via the CAN bus of the vehicle to the vehicle camera.

Overtaking vehicles can preferably be identified, following a compensation of the natural rotation of the vehicle camera, due to the negative $t_z$ component of the motion of the relevant plane.

Following a compensation of the natural rotation of the vehicle camera, approaching objects can advantageously be identified as potential collision objects by means of the positive $t_z$ component of the motion of the relevant plane.

According to an advantageous further development, following a compensation of the natural rotation of the vehicle camera, vehicles driving in a curve can be identified by a lateral, nonzero $t_x$ component of the motion of the relevant plane.

Absolute speeds of objects can preferably be established from the inverse TTC/the components $t_x, t_y, t_z$ of the motion of the relevant planes, if a disparity map is present in a vehicle stereo camera. If the vehicle camera is itself configured as a stereo camera, a disparity map can be generated by an evaluation, which is familiar to the person skilled in the art, of a simultaneously captured pair of images from the two camera modules. The distance from an object for one pixel of a camera module is therefore known. This is also possible if a disparity map is available by means of an additional stereo camera or other 3D camera in the vehicle, and the vehicle camera is configured as a mono camera.

If a respective homography i.e. homograph with all of the degrees of freedom is computed for each plane, this can advantageously also be used to reconstruct the 3D surroundings, in particular close to the epipole in that, instead of the measured position $x_{t0}$, the predicted position $H*x_{t1}$ is used for triangulation.

According to a preferred embodiment, an object which has been "exposed" once as a moving object (for which a motion of the relevant plane has been ascertained) can be subsequently tracked, with the label or the additional info "is a moving object".

Geometric tracking of a moving object can be advantageously performed, i.e. a fixed width, height and/or length of the object can be assumed. The motion in following images can be excellently predicted and a dense optical flux field can be generated by means of the homograph and previous motion of a plane.

An image can preferably be subdivided by a grid into similar cells, and a homograph can be computed for each cell from the corresponding features determined therein. Cells having a matching homograph can subsequently be clustered.

If the computed homography i.e. homograph of a first cell does not sufficiently match the homograph of an adjacent cell, a so-called back projection error i.e. reprojection error of individual corresponding features can preferably and advantageously be observed in order to determine a plane boundary.

Corresponding features can be assessed by the back projection error. The back projection error indicates the difference between the measured flux and the flux predicted from the computed homography. In other words, the back projection error of a plane designates the difference between a point x at the second point in time t–0 and the corresponding point projected or imaged according to the homography of this plane at the previous first point in time t–1 (see below: equation 4).

If the back projection error of a corresponding feature in a first cell is compared with the back projection errors of the homographs i.e. homographies of the adjacent cells and this corresponding feature is assigned to the homography having the lowest error, then the plane boundary (or segment boundary or cluster boundary) can be refined within the first cell. In this way, various corresponding features of a cell can be associated with different planes.

The association of planes with adjacent, corresponding features can preferably be substantially determined in the whole image of the vehicle camera (e.g. in at least 80% of the image area, preferably at least 90%). Because the method according to the invention can be designed to be very fast, generic object detection or scene interpretation is possible for nearly the whole image in real time.

The subject matter of the invention is furthermore a device for detecting objects from a series of images from a vehicle camera comprising a camera control unit and evaluation electronics, wherein the camera control unit is set up or configured
a) to capture a series of images by means of the vehicle camera; and
wherein the evaluation electronics is set up/configured
b) to determine motion of planes in space, wherein the planes are determined by means of an association of adjacent, corresponding features in at least two consecutive images, and
e) to identify dynamic objects on the basis of the determined motion of a plane.

The indicated means can in particular comprise a camera control unit, a digital signal processor (DSP), a microcontroller or processor, an ASIC (Application Specific Integrated Circuit), a FPGA (Field Programmable Gate Array) and the like as well as software for performing the relevant processing steps.

The present invention can consequently be implemented in digital electronic circuits, computer hardware, firmware or software.

BRIEF DESCRIPTION OF THE DRAWINGS

Further features, advantages and effects of the invention are set out by the following description of preferred embodiment examples of the invention, wherein.

DETAILED DESCRIPTION OF EXAMPLE EMBODIMENTS OF THE INVENTION

Figure 1:
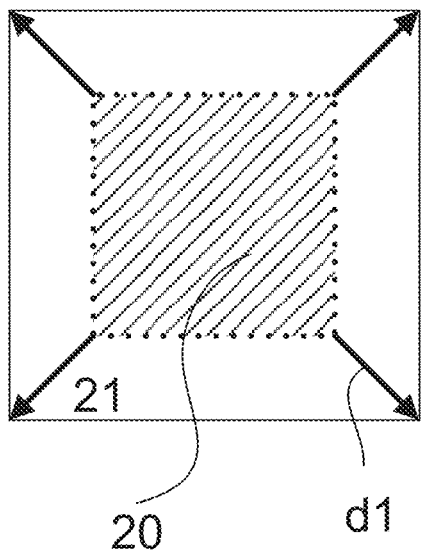
FIG. 1 schematically shows a typical deformation of an approaching back plane.

Parts corresponding to one another are, as a general rule, provided with the same reference numerals in all of the figures.

FIG. 1 schematically shows a back plane which occupies the region (20, dotted line) represented by hatching, at a first point in time t–1. At a subsequent second point in time t, the clearance or spacing distance between the vehicle camera and the back plane has decreased, resulting in the deformation of the region (21, continuous line) of the back plane in the image as indicated by the arrows (d1). The region (20; 21) is scaled or increased in size as a consequence of the relative motion of the vehicle camera with respect to the back plane.

Figure 2:
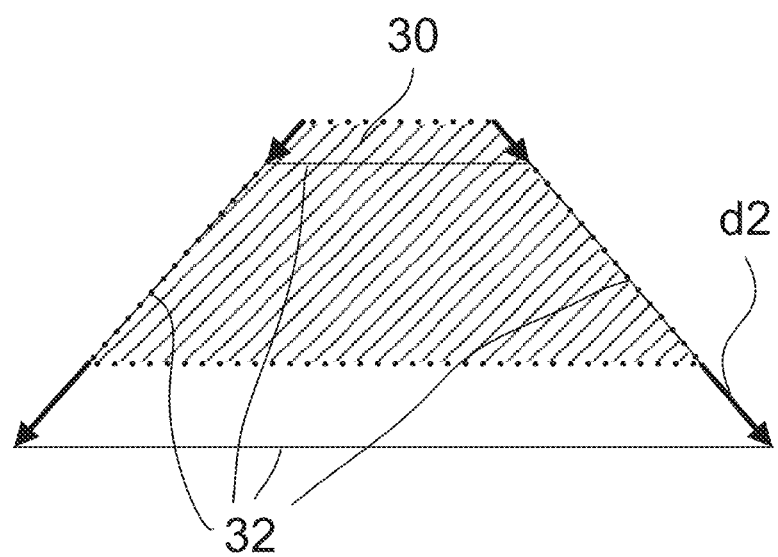
FIG. 2 schematically shows a typical deformation of an approaching ground plane.

FIG. 2 schematically shows a ground plane which occupies the region (30, dotted line) represented by hatching at a first point in time t–1. This could be a section of a road surface, on which the vehicle is driving. As a consequence of the egomotion of the vehicle camera, the region (as represented in the image) changes at a subsequent second point in time t, resulting in the deformation of the region (32) of the ground plane as indicated by the arrows (d2). At the second point in time t, the lines designated with 32 delimit the region of the ground plane. Here, the term "ground plane" thus denotes a delimited region on the road surface. The edge region is produced e.g. from signatures (or edge points) on the road surface, which can be tracked in the series of images.

Figure 3:
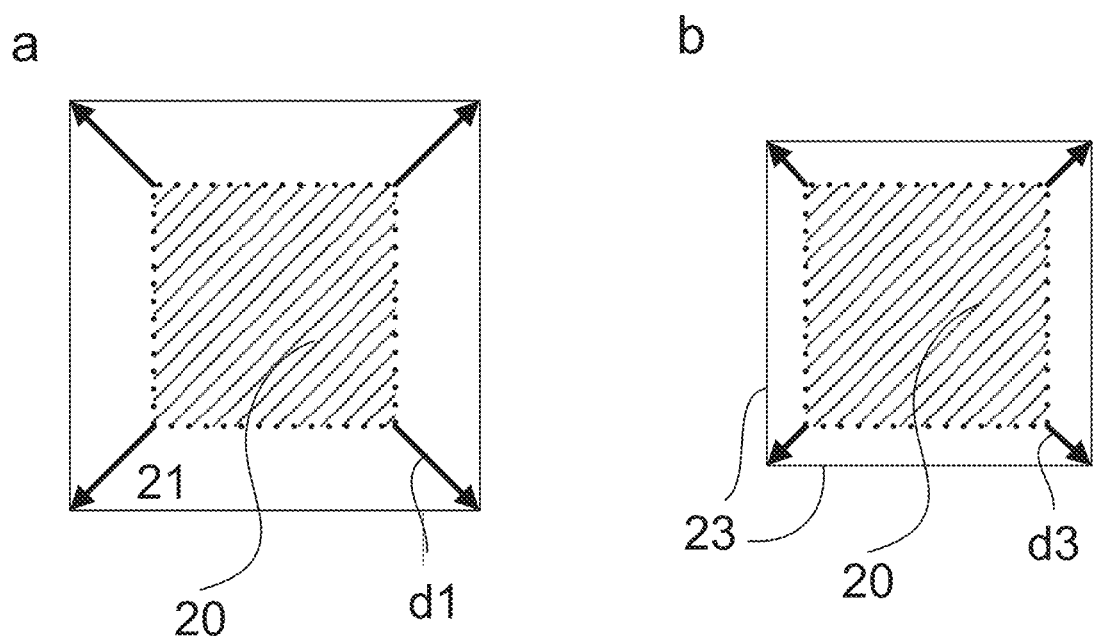
FIG. 3 schematically shows a typical deformation of a) a rapidly approaching back planes and b) a slowly approaching or more distant back plane.

FIG. 3 illustrates the difference between a quickly approaching back plane (FIG. 3a: 20, 21; deformation d1) and a slowly approaching back plane (FIG. 3b: 20, 23; deformation d3), if at the first point in time t–1 the back plane (20) in FIG. 3a has the same clearance or spacing distance from the vehicle camera as the back plane (20) in FIG. 3b.

Alternatively, FIG. 3 could represent the difference between a close back plane (FIG. 3a: 20, 21; deformation d1) and a more distant back plane (FIG. 3b: 20, 23; deformation d3), which move e.g. at the same (relative) speed, in which case the object (20, 23) represented in FIG. 3b would be larger in real space than the object (20, 21) represented in FIG. 3a.

If, instead of individual correspondences, multiple adjacent correspondences are observed, objects can be segmented due to different speeds, scalings and deformation.

If it is assumed that the world consists of planes, these can be described by homographs i.e. homographies and can be separated or distinguished from one another as shown below by means of their distance, speed and orientation. A homograph describes the correspondence of points on one plane between two camera positions or the correspondence of two points in two consecutive frames:

$$x_{t0} = H * x_{t1} \text{ with } x_{t0} = \begin{bmatrix} x_0 \\ y_0 \\ 1 \end{bmatrix}, x_{t1} = \begin{bmatrix} x_1 \\ y_1 \\ 1 \end{bmatrix}. \tag{1}$$

In this case, the vector $x_{t0}$ describes the 3D correspondence at the point in time t–0 of the vector $x_{t1}$ at the point in time t–1. A homograph can be computed, in an image-based manner, by knowledge of four point correspondences (cf. Tutorial: Multiple View Geometry, Hartley, R. and Zisserman, A., CVPR June 1999: https://de.scribd.com/document/96810936/Hartley-Tut-4up accessed on 26 Sep. 2016). The relationships indicated at the top left (slide 21) of page 6 of the tutorial can be formulated as follows in the notation of equation 1:

$$\begin{bmatrix} -x_0 & -y_0 & -1 & 0 & 0 & 0 & x_1 x_0 & x_1 y_0 & x_1 \\ 0 & 0 & 0 & -x_0 & -y_0 & -1 & y_1 x_0 & y_1 y_0 & y_1 \\ & & & & \vdots & & & & \end{bmatrix} * \begin{bmatrix} h_1 \\ h_2 \\ h_3 \\ h_4 \\ h_5 \\ h_6 \\ h_7 \\ h_8 \\ h_9 \end{bmatrix} = 0 \quad (2)$$

$$\text{where } H = \begin{bmatrix} h_1 & h_2 & h_3 \\ h_4 & h_5 & h_6 \\ h_7 & h_8 & h_9 \end{bmatrix}.$$

Alternatively, knowing the camera translation t, the rotation R and the distance d along the normal vector n of the plane, the homograph can be computed in accordance with equation 3. Equation 3 illustrates that, at a nonzero inverse TTC t/d, planes having a different orientation n can be modelled and that planes having an identical orientation n can be separated by means of their inverse TTC.

$$H = \left[ R - \frac{t * n'}{d} \right] \quad (3)$$

A homograph can be theoretically decomposed into the normal vector n, the rotation matrix R and the inverse TTC t/d. Unfortunately, this decomposition is numerically extremely unstable and sensitive to measuring errors.

If a scene is described by planes, it can be segmented as indicated below.

Figure 4:
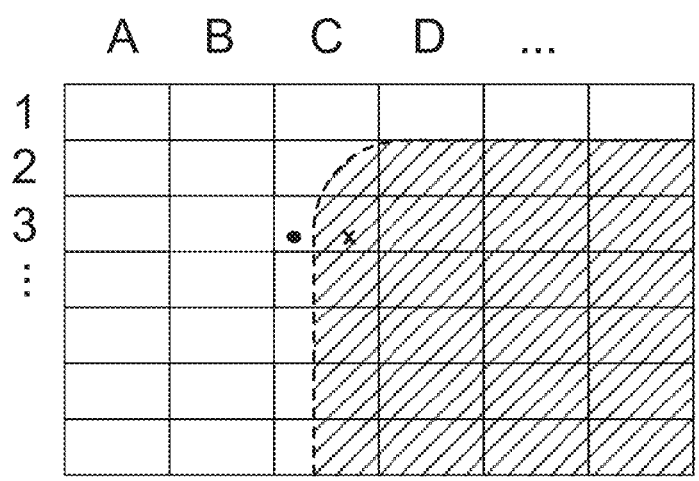
FIG. 4 schematically shows a subdivision of an image having two different segments into cells.

FIG. 4 schematically shows a subdivision into cells (grid, gridlines). The scene is subdivided into N×M initial cells and a clear i.e. unambiguous or unique ID is assigned respectively to each point correspondence. This ID firstly indicates the affiliation to a cell. The ID can subsequently indicate the affiliation to a cluster or an object. An object (in particular a back plane) is represented hatched in the foreground. The background is represented in white.

If a cell comprises only one object (cells B3, D3), a homograph or homography will describe this cell very well. If, however, a cell contains more than one object (cell C3), the homograph will not describe either of the two objects well. If the point correspondences (black dot or black cross or x) are associated with the clusters (or segment) of the adjacent cells (B3 or D3) by means of their back projection error, the black dot is associated with the segment of the cell B3 and the black cross is associated with the segment of the cell D3, because the homograph for the cell C3 does not describe either the foreground or the background well.

If prior knowledge of a scene exists, the segment sizes can be adjusted to the scene in that e.g. larger regions in the close region of the vehicle or in regions having a positive classification answer can be generated. A dedicated back plane, ground plane and side plane homograph i.e. homography is computed for each segment, as shown in equations 5 to 10.

The computation of the back plane, ground plane and side plane homograph i.e. homography increases the selectivity because a homography with fewer degrees of freedom can only poorly model regions which contain different planes and, consequently, corresponding points will have a higher back projection error, see FIG. 4. Therefore, the back projection error $e_i$ is a measure of how well a point x at the second point in time t–0 is described by the homography of a plane i of the corresponding point at the first point in time t–1:

$$e_i = x_{t0} - H_i x_{t1}. \quad (4)$$

If the static installation position of the camera and camera rotation are assumed in two different views (e.g. due to knowledge of the camera calibration and due to the computation of the fundamental matrix in a monocular system or due to rotation values of a rotation rate sensor cluster), the inverse TTC t/d can be computed by means of the flux vectors compensated for by the static camera rotation, as is shown below by way of example for a ground plane n'=[0 1 0]. If the rotation is not known, it can be approximately replaced by a unit matrix.

If the quotient t/d is substituted by the inverse time to collision $$\begin{bmatrix} t_x \\ t_y \\ t_z \end{bmatrix}$$

in equation 3, it follows that:

$$\begin{bmatrix} x_0 \\ y_0 \\ 1 \end{bmatrix} = \begin{bmatrix} R - \begin{matrix} 0 & t_x & 0 \\ 0 & t_y & 0 \\ 0 & t_z & 0 \end{matrix} \end{bmatrix} \begin{bmatrix} x_1 \\ y_1 \\ 1 \end{bmatrix} \Rightarrow \begin{bmatrix} x_0 \\ y_0 \\ 1 \end{bmatrix} - R \begin{bmatrix} x_1 \\ y_1 \\ 1 \end{bmatrix} = - \begin{bmatrix} 0 & t_x & 0 \\ 0 & t_y & 0 \\ 0 & t_z & 0 \end{bmatrix} \begin{bmatrix} x_1 \\ y_1 \\ 1 \end{bmatrix}. \quad (5)$$

By introducing the constants a, b, c, wherein $$\begin{bmatrix} a \\ b \\ c \end{bmatrix} := R \begin{bmatrix} x_1 \\ y_1 \\ 1 \end{bmatrix},$$

equation 5 produces the simplified form:

$$\begin{bmatrix} x_0 \\ y_0 \\ 1 \end{bmatrix} - \begin{bmatrix} a \\ b \\ c \end{bmatrix} = - \begin{bmatrix} t_x y_1 \\ t_y y_1 \\ t_z y_1 \end{bmatrix} \Rightarrow \begin{bmatrix} x_0 \\ y_0 \\ 1 \end{bmatrix} = \begin{bmatrix} a \\ b \\ c \end{bmatrix} - \begin{bmatrix} t_x y_1 \\ t_y y_1 \\ t_z y_1 \end{bmatrix}. \quad (6)$$

The result of standardizing the homogeneous coordinates is:

$$x_0(c - t_z y_1) = a - t_x y_1 \quad (7)$$

$$y_0(c - t_z y_1) = b - t_y y_1 \quad (8)$$

For more than one measurement, an equation system of the form Mx=v with a vector x to be established, a matrix M and a vector v (see equation 9) is produced, which can be solved for at least three image correspondences as sampling points by e.g. a singular value decomposition or a least squares method:

$$\begin{bmatrix} x_0 c - a \\ y_0 c - b \\ \vdots \end{bmatrix} = \begin{bmatrix} -y_1 & 0 & y_1 x_0 \\ 0 & -y_1 & y_1 y_0 \\ & \vdots & \end{bmatrix} * \begin{bmatrix} t_x \\ t_y \\ t_z \end{bmatrix}. \quad (9)$$

The back and side plane homographs i.e. homographies can be deduced similarly and respectively produce:

$$\begin{bmatrix} x_0 c - a \\ y_0 c - b \\ \vdots \end{bmatrix} = \begin{bmatrix} -x_1 & 0 & x_1 x_0 \\ 0 & -x_1 & x_1 y_0 \\ & \vdots & \end{bmatrix} \begin{bmatrix} t_x \\ t_y \\ t_z \end{bmatrix} \quad (10)$$

or respectively 
$$\begin{bmatrix} x_0 c - a \\ y_0 c - b \\ \vdots \end{bmatrix} = \begin{bmatrix} -1 & 0 & x_0 \\ 0 & -1 & y_0 \\ & \vdots & \end{bmatrix} \begin{bmatrix} t_x \\ t_y \\ t_z \end{bmatrix}. \quad (11)$$

In order to segment larger objects consisting of multiple cells, adjacent cells can be combined in a further step, in that the back projection or reprojection errors $\Sigma x_{t0}{}^i - H_j x_{t1}{}^i$ or $\Sigma x_{t0}{}^j - H_i x_{t1}{}^j$ are computed by means of sampling points (see point 1 below: RANSAC) of the adjacent segments j and i and their homographs i.e. homographies. Two adjacent clusters are combined, if $\Sigma x_{t0}{}^i - H_j x_{t1}{}^i$ is less than $\Sigma x_{t0}{}^i - H_i x_{t1}{}^i$ or e.g. the back projection error standardized for the predicted flux length is below an adjustable threshold. In particular, two adjacent clusters can be combined, if $\Sigma x_{t0}{}^i - H_j x_{t1}{}^i$ is less than $\Sigma x_{t0}{}^i - H_i x_{t1}{}^i$ and the two back projection errors $\Sigma x_{t0}{}^i - H_j x_{t1}{}^i$ and $\Sigma x_{t0}{}^i - H_i x_{t1}{}^i$ fall below a threshold standardized for the flux length. Alternatively, back projection errors can be used as potentials in a graph and a global solution can be computed. The compactness of the clusters can, in this case, be established via the edge potentials in the graph.

If the segments have been combined, the homographs i.e. homographies are computed again and the point correspondences are associated with the clusters having the smallest back projection error. f only directly neighboring clusters are observed, very compact objects can be generated. If the minimum error exceeds an adjustable threshold, new (cluster/object) IDs are assigned to the correspondences, in order to be able to identify partially concealed objects or objects having a slightly different TTC. By adjusting the threshold, the resolution of (slightly) different objects can be adjusted.

The back projection errors can be provided with a bias which reduces the costs for related regions or a bias which increases the costs for an ID change, if point correspondences were to have the same ID affiliation over a longer period of time.

Figure 5:
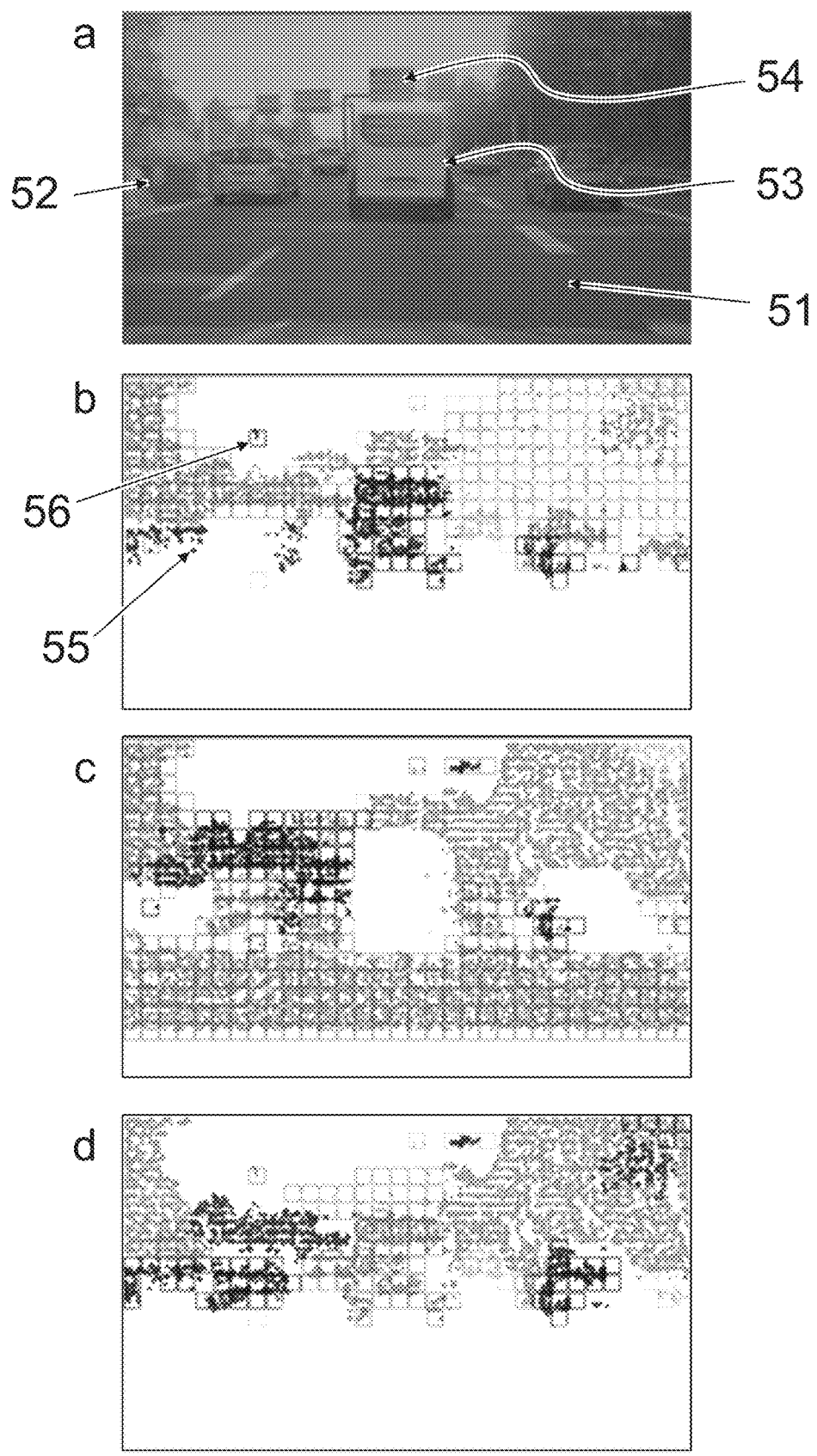
FIG. 5 shows segmenting results following a third iteration step.

FIG. 5 shows one example of a scene segmentation:

FIG. 5a shows an image which has been captured by a vehicle camera which is arranged in the interior of the vehicle and records the surroundings lying ahead through the windshield. A three-lane road (51), e.g. a motorway, can be seen. The lanes are separated by appropriate lane markings. Vehicles are driving on all three lanes. The vehicle (53) driving ahead on the ego lane possibly conceals further vehicles driving ahead, which are located on the ego lane. A structural elevated delimitation (52) with respect to the opposite carriageway is located on the left of the three-lane road. A shoulder or breakdown lane, which is delimited to the right by a guardrail, behind which there is woodland, is located to the right of the three-lane road (51). Sign gantries (54) can be identified some distance in front of the ego vehicle, one of which spans the three-lane road (51).

This scene can be segmented in a similar way to the method described by means of FIG. 4. In FIGS. 5b to 5d, cells (56) can be identified. Point correspondences (55) are represented in the cells. The association of a cell (56) with a segment is represented by means of the color of the cell frame or the point correspondences (55).

FIG. 5b shows the red channel of the segmented image, FIG. 5c shows the green channel and FIG. 5d shows the blue channel. Different segments have been provided with different colors. A segment, which is green in the original, extends over the lowest five to six lines (accordingly represented in white in FIGS. 5b and 5d and without a cell border). This segment corresponds to the ground plane, that is to say the surface of the road (51) on which the ego car is driving.

A further segment can be identified in the middle of the image, in the original it is pink. It therefore has high red values in FIG. 5b, weaker blue values in FIG. 5d and no green values in FIG. 5c. This segment corresponds to the back plane of the (transporter) vehicle (53) driving ahead on the ego lane.

The segmenting result shown was determined without prior knowledge of the scene in only three iteration steps. This shows the enormous speediness and performance of an embodiment of the invention by temporal integration.

Figure 6:
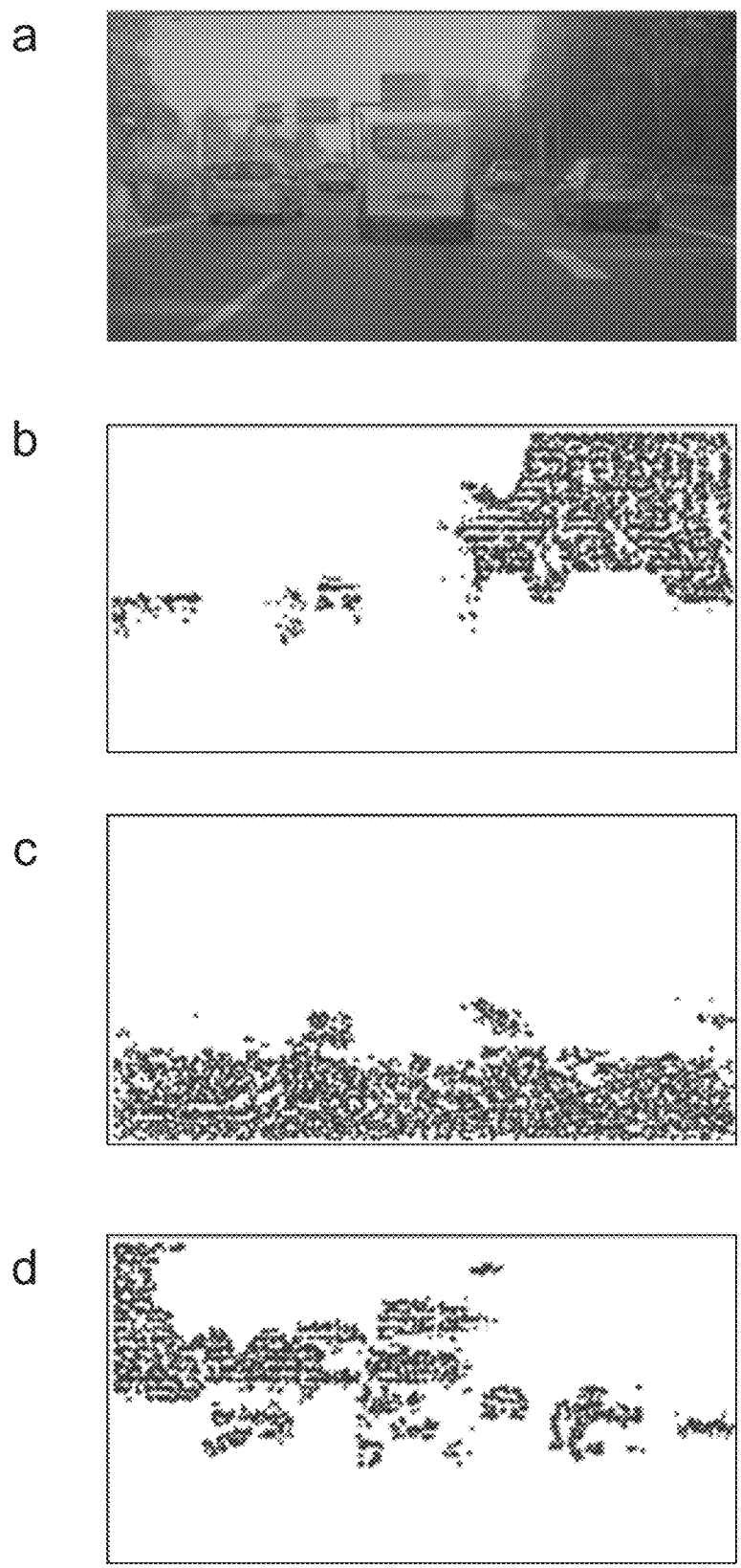
FIG. 6 shows a plane orientation for target validation (validation of potential collision objects)

FIG. 6 shows a determination of the orientation of planes in the scene already described in FIG. 5. For the purposes of orientation, FIG. 6a shows the surrounding situation according to FIG. 5a again.

FIG. 6b shows all of the correspondences which are associated with a side plane. The correspondences at the left edge have been associated with a right side plane, which is correct because the right side of the structural delimitation (52) with respect to the opposite carriageway is located there in the image. The correspondences in the right half of the image have been associated with the left side planes, which is likewise correct, because the "left side" of the road peripheral development or planting of vegetation is located there in the image.

FIG. 6c shows which correspondences are associated with a ground plane, which is correct, because the surface of the road (51) can be seen there in the image.

FIG. 6d shows which correspondences are associated with a back plane. This is mostly correct. Different back planes cannot yet be sufficiently distinguished from this determination alone, e.g. that of the delivery van (53) driving ahead on the same lane from the signs of the sign gantry (54) arranged above it in the image. However, important information regarding where elevated objects occur in the surroundings of the vehicle can already be extracted from this representation.

Figure 7:
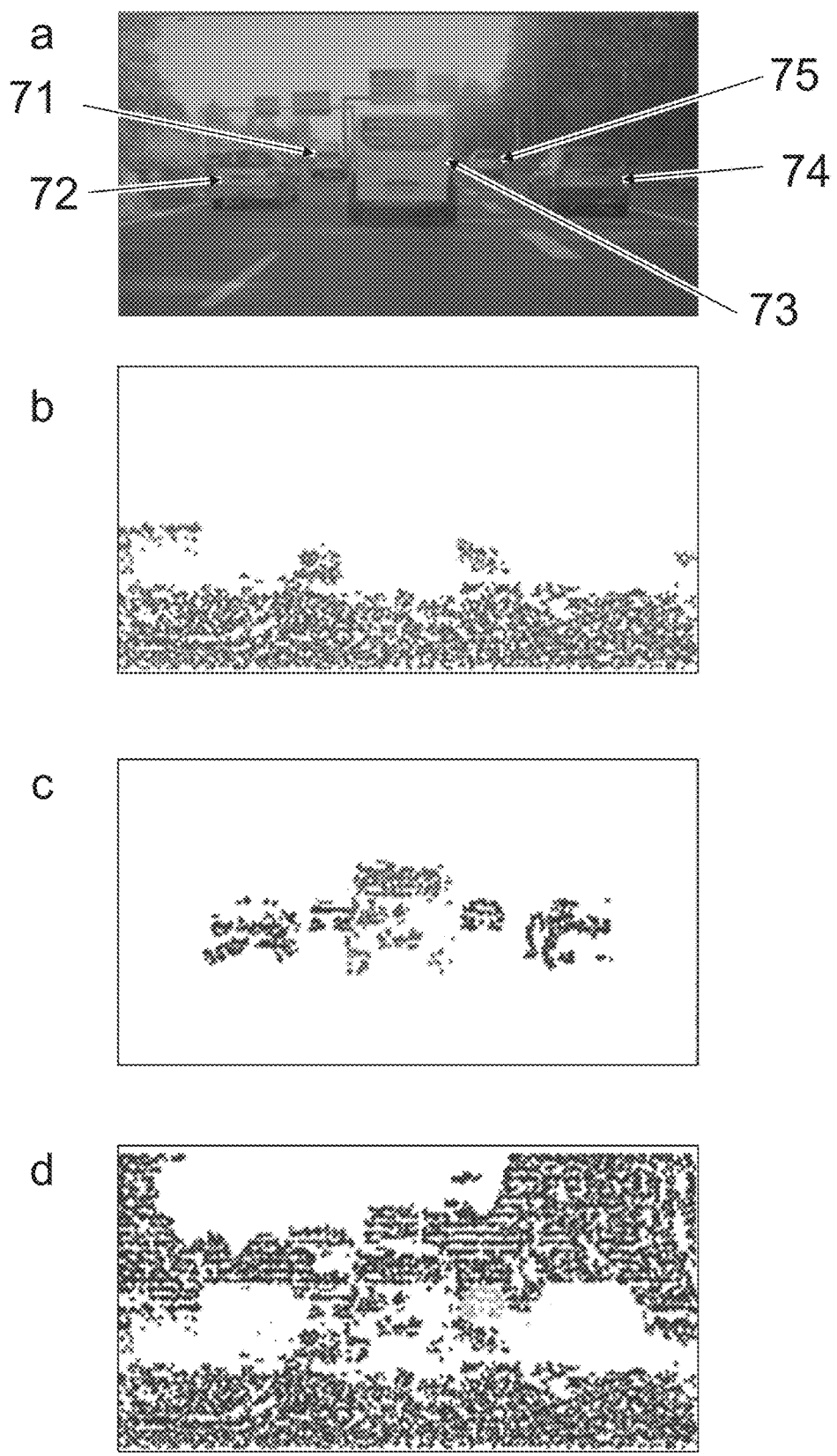
FIG. 7 shows time to collision monitoring.

As illustrated in FIG. 7, the inverse TTC ($t_x$, $t_y$, $t_z$) can be used to identify dynamic objects.

FIG. 7a, in turn, shows the image of the vehicle situation (identical to FIG. 6a). The vehicle (73) driving ahead on the ego lane is a delivery van. Two vehicles (71 and 72) are driving on the left lane and two further vehicles (74 and 75) are driving on the right lane.

FIG. 7b shows correspondences which, in turn, correspond to the ground plane (violet in the original) and are the only ones to have a red proportion or color component.

FIG. 7c shows correspondences which are associated with moving objects. These are green in the original if they are moving away from the ego vehicle (that is to say they are driving faster), or turquoise if they are driving more slowly.

FIG. 7d shows correspondences having a blue proportion or color component, that is to say those which correspond to the ground plane (cf. FIG. 7b), moving objects which are approaching the ego vehicle (cf. FIG. 7c) and those which correspond to static elevated objects, these are only represented in FIG. 7d, such as e.g. woodland to the left and right of the motorway and the sign gantries. It can be seen from FIGS. 7c and 7d jointly that the vehicle (73) is approaching on the ego lane. The same applies to the front vehicle (75) on the right lane. On the other hand, the remaining vehicles (71, 72 and 74) are moving away. Due to a lack of structure in the image, the region which corresponds to the sky in the image does not result in any correspondences (white in FIGS. 7b to 7d).

If the natural rotation is considered in the correspondences prior to the computation of the homograph i.e. homography, or if the natural rotation is considered in the rotation matrix R, overtaking vehicles can be identified due to their negative $t_z$ component or swerving vehicles or vehicles driving in a curve can be identified by a nonzero lateral $t_x$ component. If the dynamic segments are predicted by means of their homographs (see "consolidation of the optical flux based on homographs" below), a dynamic map can be constructed over time.

If equation 3 is observed, it can be seen that segments having an inverse TTC equal to zero describe the rotation matrix and these can be established by computing a homograph with a full degree of freedom (equation 2) from segments with t/d equal to zero. If it is assumed that the translatory components in the vicinity of the epipole cannot make themselves felt, the pitch rate and yaw rate can also be established by predicting the coordinates of the epipole ($x_e$, $y_e$) through the homograph of static segments and computing the a $\tan((x_{e0}-x_{e1})/f)$ or a $\tan((y_{e0}-y_{e1})/f)$ with the focal length f based on one pixel.

If a homograph is computed with all degrees of freedom for each cluster, this can also be used to reconstruct the 3D surroundings in that, instead of the measured position $x_{t0}$, the predicted position $H^*x_{t1}$ is used for triangulation. This not only reduces the effect of measuring errors, but also makes it possible to reconstruct objects close to the epipole.

One embodiment example for consolidating the optical flux based on homographs is described below.

If the segmentation is known at the point in time t−1, it can be used to both predict the objects and to generate a dense flux field. Signature-based flux methods produce signatures and cause these to be clearly associated in consecutive frames. The signatures are mostly computed from a patch (image section or image region) of a defined size. If, however, the size and form of a patch alter, it is no longer possible to find a correspondence with a fixed template (model, specimen, e.g. an image section of an image of the series of images, which corresponds to an object—for example a vehicle template—is meant). If e.g. one is approaching a back plane, the size of a patch changes. Or if one is moving over a ground plane or parallel to a side plane, both the size and the form of a patch change, see FIGS. 1 and 2). If the segmentation exists at the point in time t−1, the homographs can be computed again by means of flux vectors which have already been found, and can be used to predict the position and form of correspondences of t−1 to t−0 which have already been established.

Alternatively, the current frame can be transformed at the point in time t−0 to the point in time t−1, in order to compensate for changes in scale and form.

Figure 8:
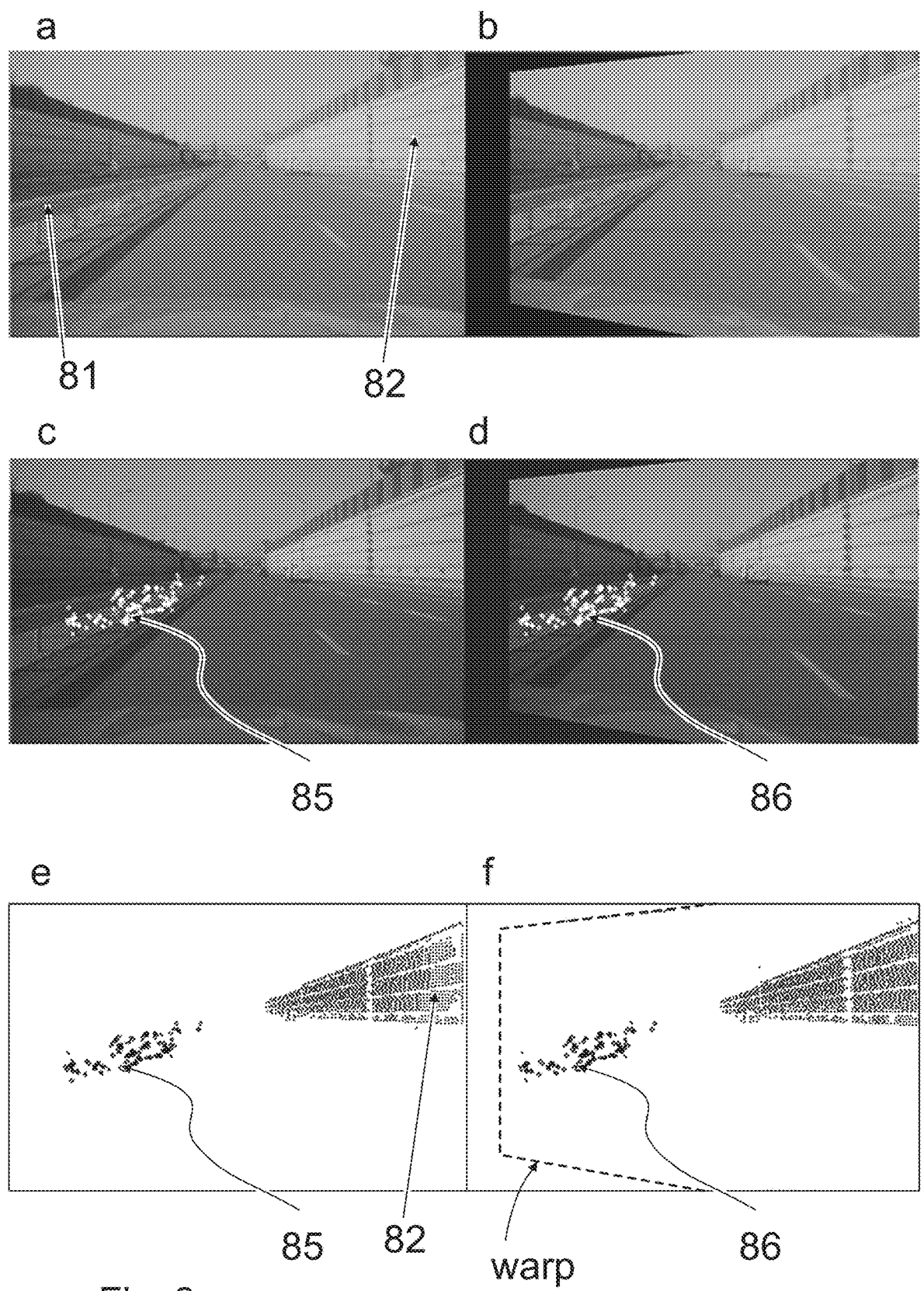
FIG. 8 shows a projection (or warping) of the guardrail segment at the point in time t–0 (right) onto t–1 (left).

FIG. 8 illustrates such a procedure.

FIG. 8a shows an image of another driving situation which has been captured by the vehicle camera at a point in time t−1. A motorway having three lanes in each direction of travel can be seen. To the left of the ego three-lane road there is a guardrail (81) as an elevated delimitation with respect to the opposite carriageway. A noise barrier (82) is located on the right of the road.

FIG. 8b shows an image which was captured at the subsequent point in time t and transformed (warped) by means of the homograph of the guardrail such that the changes in the image occurring as a consequence of the motion of the vehicle and therefore of the vehicle camera between the two capturing times are compensated for in the region of the guardrail. In FIG. 8b, the forward motion of the ego vehicle results in the most obvious graduation line of the lane marking being closer to the ego vehicle than in FIG. 8a. The transformation results in the trapezoidal shifting of the image, which is illustrated by a dashed line in FIG. 8f.

FIG. 8c then shows corresponding features (85), which have been determined in the region of the guardrail (81, cf. FIG. 8a) as white dots.

FIG. 8d shows where these corresponding features (86) are to be expected in the next image, after said image has been transformed as described with reference to FIG. 8b.

In FIGS. 8e and 8f, this state of affairs is again shown in a black and white representation, wherein the corresponding features (85) now correspond to the black dots on the guardrail (81) in the left half of the image.

In order to generate a dense flux field, the current image can thus be warped onto the previous image for each segment, in order to rediscover already existing correspondences which have changed in their scale or form, or in order to establish new correspondences by means of congruent templates.

If not enough flux vectors for computing a homograph again are present in a current frame, the homograph from the last frame can be approximately used to make the correspondence finding more robust to changes in form and scale.

The following configuration forms or aspects are advantageous and can be provided individually or in combination:

1. The image is subdivided into N×M cells and a clear i.e. unique or unambiguous cell ID is assigned to the point correspondences of a cell. The back plane, ground plane and side plane homographs i.e. homographies (equations 9, 10 and 11) are computed by means of RANSAC from the correspondences with the same IDs, and both the homography having the lowest back projection error and the sampling points used to calculate the homography are stored. In the case of the RANSAC (RAndom SAmple Consensus) method, a minimum number of randomly selected correspondences is usually used for each iteration, in order to form a hypothesis. A value, which describes whether the corresponding feature supports the hypothesis, is subsequently computed for each corresponding feature. If the hypothesis attains sufficient support through the corresponding features, then the non-supporting corresponding features can be rejected as outliers. Otherwise, a minimum number of correspondences is selected again at random.

2. The back projection errors $\Sigma x_{t0}{}^i - H_j x_{t1}{}^i$ or $\Sigma x_{t0}{}^i - H_i x_{t1}{}^j$ are computed by means of the sampling points of the adjacent homograph i.e. homography for adjacent cells i, j. If the back projection error $\Sigma x_{t0}{}^i - H_j x_{t1}{}^i$ is less than $\Sigma x_{t0}{}^i - H_i x_{t1}{}^i$ or if the errors fall below a threshold standardized for the flux length, the IDs are combined and the homographies are computed again. In particular, two adjacent cells can be clustered as belonging to the same plane (or to the same segment or to the same object), if the back projection error $\Sigma_i(x_{t0}{}^i - H_j x_{t1}{}^i)$ is less than $\Sigma_i(x_{t0}{}^i - H_j x_{t1}{}^i)$ and if both back projection errors $\Sigma_i(x_{t0}{}^i - H_j x_{t1}{}^i)$ and $\Sigma_i(x_{t0}{}^i - H_j x_{t1}{}^i)$ fall below a threshold standardized for the flux length.

3. The back projection errors $x_{e0} - H_j x_{t1}$ of all of the point correspondences are computed for the adjacent segments and a point correspondence is associated with the segment having the lowest back projection error. If the minimum error exceeds a threshold, the correspondences are provided with a new object ID in order to also be able to identify smaller or partially concealed objects.

4. The homographs of the segments extracted at the point in time t–1 are computed again at the start of a new frame (t–0) by means of the image correspondences already found and the already existing segment IDs in the current frame are predicted. If not enough flux vectors are available to compute a homograph again in the current frame, the homographs from the last frame can be approximately used.

5. In order to generate a dense flux field, the current frame (t–0) is warped onto the last frame (t–1) for each segment, in order to rediscover already existing correspondences which have changed in their scale or form, or in order to establish new correspondences.

6. The back projection errors of the back plane, ground plane and side plane can be used to validate elevated targets, see FIG. 6.

7. If e.g. a disparity map exists in a vehicle stereo camera, the absolute speeds can be computed from the inverse TTC t/d, because then the absolute distances d are present for individual pixels in the disparity map.

8. If a complete homograph is computed with all degrees of freedom for each segment, the rotation matrix R can be established from segments having a TTC close to infinite (or inverse TTCs approaching zero).

9. The 3D surroundings can be reconstructed from the predicted position $(Hx_{t1}, x_{t1})$ instead of the measured position $(x_{t0}, x_{t1})$ and make it possible to also reconstruct objects at the epipole.

The invention claimed is:

1. A method of detecting dynamic objects, comprising the steps:
    a) with a camera of a vehicle, capturing a series of images including a first image at a first time and a second image at a second time after the first time;
    b) determining a plurality of corresponding feature pairs, wherein each one of the corresponding feature pairs respectively consists of corresponding first and second features in the first and second images;
    c) establishing a plurality of spatial planes including at least one back plane extending normal to a longitudinal direction of the vehicle, at least one ground plane extending horizontally, and at least one side plane extending vertically and along the longitudinal direction of the vehicle, wherein each respective one of the spatial planes is established by associating, with the respective spatial plane, a respective plurality of adjacent feature pairs among the corresponding feature pairs;
    d) detecting an object in the series of images based on the adjacent feature pairs associated with a selected one of the spatial planes that have been established;
    e) determining a respective relative translation vector having orthogonal vector components $t_x$, $t_y$ and $t_z$ for each respective one of the spatial planes as a measure of a motion of the respective spatial plane; and
    f) identifying the object as a dynamic object based on the relative translation vector of the selected spatial plane;
        wherein the associating of the adjacent feature pairs with the respective spatial planes comprises computing homographies and using the homographies to associate the adjacent feature pairs with the respective spatial planes;
        wherein the homographies describe correspondences of points or features in a respective selected image region in the first image at the first time with same or corresponding points or features in the respective selected image region in the second image at the second time;
        wherein each one of the homographies has only three degrees of freedom respectively relating to the orthogonal vector components $t_x$, $t_y$ and $t_z$; and
        wherein the determining of the respective relative translation vector for each one of the spatial planes involves inverting a 3×3 matrix to solve for the three degrees of freedom of the respective homography associated with the respective plane; and
        wherein the respective relative translation vector indicates the orientation of the selected image region.

2. The method according to claim 1, wherein the relative translation vector is defined as t/d, wherein t represents a translation of the camera of the vehicle, and d represents a distance from the selected spatial plane.

3. The method according to claim 2, wherein $t/d = (t_x, t_y, t_z)$.

4. The method according to claim 1, wherein the associating of the adjacent feature pairs with the respective spatial planes comprises:
    computing respective ones of the homographies respectively for the ground plane, the back plane and the side plane,
    projecting the first feature from the first image as a respective projected feature respectively onto the ground plane, the back plane and the side plane using respective applicable ones of the homographies,
    determining respective projection errors as respective differences between the second feature in the second image and the respective projected feature respectively for the ground plane, the back plane and the side plane, and
    selecting, as the spatial plane to which the adjacent feature pairs are associated, the one of the ground plane, the back plane and the side plane for which the respective projection error is the smallest among the projection errors.

5. The method according to claim 1, wherein a respective one of the homographies is computed for the back plane in accordance with:

$$\begin{bmatrix} x_0 c - a \\ y_0 c - b \\ \vdots \end{bmatrix} = \begin{bmatrix} -x_1 & 0 & x_1 x_0 \\ 0 & -x_1 & x_1 y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are the orthogonal vector components of the relative translation vector represented as t/d, t represents a translation of the camera, and d represents a distance from the respective back plane.

6. The method according to claim 1, wherein a respective one of the homographies is computed for the ground plane in accordance with:

$$\begin{bmatrix} x_0 c - a \\ y_0 c - b \\ \vdots \end{bmatrix} = \begin{bmatrix} -y_1 & 0 & y_1 x_0 \\ 0 & -y_1 & y_1 y_0 \\ & \vdots & \end{bmatrix} * \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are the orthogonal vector components of the relative translation vector represented as t/d, t represents a translation of the camera, and d represents a distance from the respective ground plane.

7. The method according to claim 1, wherein a respective one of the homographies is computed for the side plane in accordance with:

$$\begin{bmatrix} x_0 c - a \\ y_0 c - b \\ \vdots \end{bmatrix} = \begin{bmatrix} -1 & 0 & x_0 \\ 0 & -1 & y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are the orthogonal vector components of the relative translation vector represented as t/d, t represents a translation of the camera, and d represents a distance from the respective side plane.

8. The method according to claim 1, further comprising:
determining that a particular one of the spatial planes is a static plane when the motion thereof is zero as indicated by the respective relative translation vector thereof having a vector length of zero, and
determining a self-rotation of the camera between the first image and the second image based on the adjacent feature pairs associated with the at least one static plane.

9. The method according to claim 8, further comprising predicting image coordinates of an epipole $x_{s,t0}$ of the second image at the second time $t_0$ according to $x_{s,t0} = H_{st} * x_{s,t1}$, wherein $H_{st}$ represents a homography of the at least one static plane and $x_{s,t1}$ represents image coordinates of an epipole of the first image at the first time $t_1$.

10. The method according to claim 9, further comprising establishing a pitch rate of the camera as a $\tan((x_{s0} - x_{s1})/f)$ wherein f is a focal length of the camera with respect to one pixel of the camera.

11. The method according to claim 9, further comprising establishing a yaw rate of the camera as a $\tan(y_{s0} - y_{s1})/f)$ wherein f is a focal length of the camera with respect to one pixel of the camera.

12. The method according to claim 1, further comprising: determining and compensating a self-rotation of the camera, and identifying the dynamic object as an overtaking vehicle when the relative translation vector of the selected spatial plane to which the dynamic object has been associated includes the vector component $t_z$ having a negative value, wherein the vector component $t_z$ extends in the longitudinal direction of the vehicle.

13. The method according to claim 1, further comprising:
determining and compensating a self-rotation of the camera, and
identifying the dynamic object as an approaching potential collision object when the relative translation vector of the selected spatial plane to which the dynamic object has been associated includes the vector component $t_z$ having a positive value, wherein the vector component $t_z$ extends in the longitudinal direction of the vehicle.

14. The method according to claim 1, further comprising:
determining and compensating a self-rotation of the camera, and
identifying the dynamic object as an other vehicle driving in a curve when the relative translation vector of the selected spatial plane to which the dynamic object has been associated includes the vector component $t_x$ having a non-zero value, wherein the vector component $t_x$ extends horizontally and transversely to the longitudinal direction of the vehicle.

15. The method according to claim 1, further comprising labeling the dynamic object as a moving object, and tracking the dynamic object in successive images of the series of images.

16. The method according to claim 1, further comprising:
assigning to the dynamic object a fixed width, a fixed height and/or a fixed length in space, and
performing geometric tracking of the dynamic object.

17. The method according to claim 1, further comprising operating a driver assistance system of the vehicle in response to and dependent on the dynamic object.

18. A device for detecting dynamic objects, comprising a camera controller and evaluation electronics, wherein:
the camera controller is configured to capture, with a camera of a vehicle, a series of images including a first image at a first time and a second image at a second time after the first time; and
the evaluation electronics are configured:
to determine a plurality of corresponding feature pairs, wherein each one of the corresponding feature pairs respectively consists of corresponding first and second features in the first and second images;
to establish a plurality of spatial planes including at least one back plane extending normal to a longitudinal direction of the vehicle, at least one ground plane extending horizontally, and at least one side plane extending vertically and along the longitudinal direction of the vehicle, wherein each respective one of the spatial planes is established by associating, with the respective spatial plane, a respective plurality of adjacent feature pairs among the corresponding feature pairs;
to detect an object in the series of images based on the adjacent feature pairs associated with a selected one of the spatial planes that have been established;
to determine a respective relative translation vector having orthogonal vector components $t_x$, $t_y$ and $t_z$ for each respective one of the spatial planes as a measure of a motion of the respective spatial plane; and
to identify the object as a dynamic object based on the relative translation vector of the selected spatial plane;

wherein the associating of the adjacent feature pairs with the respective spatial planes comprises computing homographies and using the homographies to associate the adjacent feature pairs with the respective spatial planes;

wherein the homographies describe correspondences of points or features in a respective selected image region in the first image at the first time with same or corresponding points or features in the respective selected image region in the second image at the second time;

wherein each one of the homographies has only three degrees of freedom respectively relating to the orthogonal vector components $t_x$, $t_y$, and $t_z$; and wherein the determining of the respective relative translation vector for each one of the spatial planes involves inverting a 3×3 matrix to solve for the three degrees of freedom of the respective homography associated with the respective plane; and wherein the respective relative translation vector indicates the orientation of the selected image region.

19. The device according to claim 18, wherein the camera is a single monocular camera and the images are each mono-images.

* * * * *

UNITED STATES PATENT AND TRADEMARK OFFICE
CERTIFICATE OF CORRECTION

Page 1 of 2

PATENT NO. : 11,087,150 B2
APPLICATION NO. : 16/323898
DATED : August 10, 2021
INVENTOR(S) : Michael Walter It is certified that error appears in the above-identified patent and that said Letters Patent is hereby corrected as shown below:

In the Specification

Column 4,
Line 4, after "established as", replace the mathematical expression to read: $atan((x_{e0} - x_{e1})/f)$
Line 5, after "length", replace "f" with --$f$--

Line 7, after "established as", replace the mathematical expression to read: $atan((y_{e0} - y_{e1})/f)$
Line 8, after "length", replace "f" with --$f$--

Column 5,
Line 59, after "back", replace "planes" with --plane,--

Column 8,
Line 14, replace the equation to read: $e_i = x_{t0} - H_j x_{t1}$.     (4)

Column 9,
Lines 26-27, after "errors", replace the mathematical expressions to read: $\Sigma x_{t0}^i - H_j x_{t1}^i$ or $\Sigma x_{t0}^j - H_i x_{t1}^j$ Line 30, after "combined, if", replace the mathematical expressions to read: $\Sigma x_{t0}^i - H_j x_{t1}^i$ is less than $\Sigma x_{t0}^i - H_i x_{t1}^i$ Line 33-34, after "combined, if", replace the mathematical expressions to read: $\Sigma x_{t0}^i - H_j x_{t1}^i$ is less than $\Sigma x_{t0}^i - H_i x_{t1}^i$ Line 35, after "errors", replace the mathematical expressions to read: $\Sigma x_{t0}^i - H_j x_{t1}^i$ and $\Sigma x_{t0}^i - H_i x_{t1}^i$ Signed and Sealed this
Eleventh Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)

Column 11,
Line 21, after "negative", replace "t," with --$t_z$--
Line 36, after "ing the", replace the mathematical expressions to read: $atan((x_{e0} - x_{e1})/f)$ or $atan((y_{e0} - y_{e1})/f)$
Line 37, after "length", replace "f" with --$f$--

Column 12,
Line 62, after "errors", replace the mathematical expressions to read: $\Sigma x_{t0}^i - H_j x_{t1}^i$ or $\Sigma x_{t0}^j - H_i x_{t1}^j$ Line 65, after "error", replace the mathematical expression to read: $\Sigma x_{t0}^i - H_j x_{t1}^i$ Line 66, replace the mathematical expression to read: $\Sigma x_{t0}^i - H_i x_{t1}^i$ Column 13,
Line 4, after "error", replace the mathematical expression to read: $\Sigma_i(x_{t0}^i - H_j x_{t1}^i)$ Line 5, after "than", replace the mathematical expression to read: $\Sigma_i(x_{t0}^i - H_i x_{t1}^i)$ Line 6, after "errors", replace the mathematical expressions to read: $\Sigma_i(x_{t0}^i - H_j x_{t1}^i)$ and $\Sigma_i(x_{t0}^i - H_i x_{t1}^i)$ Line 8, after "errors", replace the mathematical expression to read: $x_{t0} - H_i x_{t1}$ In the Claims Column 15,
Line 52, (2nd line in Claim 9), after "epipole", replace the mathematical expression to read: $x_{e,t0}$
Line 53, (3rd line in Claim 9), after "according to", replace the mathematical expression to read: $x_{e,t0} = H_{st} * x_{e,t1}$
Line 55, (5th line in Claim 9), after "plane and", replace the mathematical expression to read: $x_{e,t1}$
Line 58, (2nd line in Claim 10), after "camera as", replace the mathematical expression to read: $atan((x_{e0} - x_{e1})/f)$
Line 59, (3rd line in Claim 10), after "wherein", replace "f" with --$f$--
Line 62, (2nd line in Claim 11), after "camera as", replace the mathematical expression to read: $atan((y_{e0} - y_{e1})/f)$
Line 63, (3rd line in Claim 11), after "wherein", replace "f" with --$f$--